United States Patent
McGill et al.

(10) Patent No.: US 11,335,104 B2
(45) Date of Patent: May 17, 2022

(54) METHODS AND SYSTEM FOR PREDICTING DRIVER AWARENESS OF A FEATURE IN A SCENE

(71) Applicant: Toyota Research Institute, Inc., Los Altos, CA (US)

(72) Inventors: Stephen G. McGill, Broomall, PA (US); Guy Rosman, Newton, MA (US); Simon Stent, Cambridge, MA (US); Luke S. Fletcher, Cambridge, MA (US); Deepak Edakkattil Gopinath, Chicago, IL (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 147 days.

(21) Appl. No.: 16/836,419

(22) Filed: Mar. 31, 2020

(65) Prior Publication Data

US 2021/0303888 A1 Sep. 30, 2021

(51) Int. Cl.
*G06V 20/59* (2022.01)
*G06F 3/01* (2006.01)
(Continued)

(52) U.S. Cl.
CPC ........... *G06V 20/597* (2022.01); *B60W 30/08* (2013.01); *B60W 40/08* (2013.01); *B60W 50/14* (2013.01);
(Continued)

(58) Field of Classification Search
None
See application file for complete search history.

(56) References Cited

U.S. PATENT DOCUMENTS

2013/0325202 A1* 12/2013 Howard ............... B60W 40/09
701/1
2015/0339589 A1* 11/2015 Fisher ....................... B25J 9/16
706/12

(Continued)

FOREIGN PATENT DOCUMENTS

EP 3506149 A1 7/2019

OTHER PUBLICATIONS

Sourabh Vora, Akshay Rangesh, and Mohan M. Trivedi, "Driver Gaze Zone Estimation using Convolutional Neural Networks: A General Framework and Ablative Analysis", Apr. 25, 2018, 12 pages, https://arxiv.org/pdf/1802.02690.pdf.
(Continued)

*Primary Examiner* — Santiago Garcia
(74) *Attorney, Agent, or Firm* — Dinsmore & Shohl LLP

(57) ABSTRACT

An embodiment takes the form of a training server that presents a video comprising a plurality of frames, each comprising a respective scene representation of a scene at a respective time. The scene representations comprise respective representations of a feature in the scene. The training server presents a respective gaze representation of a driver gaze for each frame. The gaze representations comprise respective representations of driver gaze locations at the times of the respective scene representations. The training server generates an awareness prediction via a neural network based on the driver gaze locations, the awareness prediction reflecting a predicted driver awareness of the feature. The training server receives an awareness indication associated with the video and the gaze representations, and trains the neural network based on a comparison of the awareness prediction with the awareness indication.

20 Claims, 11 Drawing Sheets

(51) Int. Cl.
    *G06K 9/62*          (2022.01)
    *G06N 3/08*          (2006.01)
    *B60W 30/08*        (2012.01)
    *B60W 40/08*        (2012.01)
    *B60W 50/14*        (2020.01)
    *G05B 13/02*        (2006.01)
    *G06V 20/40*        (2022.01)

(52) U.S. Cl.
    CPC ........... *G05B 13/027* (2013.01); *G06F 3/013* (2013.01); *G06K 9/6262* (2013.01); *G06N 3/08* (2013.01); *G06V 20/46* (2022.01); *B60W 2050/146* (2013.01); *B60W 2420/42* (2013.01); *B60W 2540/225* (2020.02)

(56) References Cited

U.S. PATENT DOCUMENTS

| | | | |
|---|---|---|---|
| 2018/0194285 A1* | 7/2018 | Herrmann | G08G 1/166 |
| 2019/0038204 A1* | 2/2019 | Beck | A61B 5/18 |
| 2019/0147272 A1* | 5/2019 | Yokota | B60W 50/14 |
| | | | 340/576 |
| 2019/0147607 A1 | 5/2019 | Stent et al. | |
| 2019/0246036 A1* | 8/2019 | Wu | B60R 11/04 |
| 2019/0265712 A1 | 8/2019 | Satzoda et al. | |
| 2019/0332931 A1 | 10/2019 | Montantes | |
| 2020/0175691 A1* | 6/2020 | Zhang | B60W 10/20 |
| 2020/0277008 A1* | 9/2020 | Tran | B60Q 1/525 |
| 2021/0248399 A1* | 8/2021 | Martin | G06K 9/00845 |
| 2021/0263157 A1* | 8/2021 | Zhu | G01S 17/86 |

OTHER PUBLICATIONS

Andrea Palazzi, Davide Abati, Simone Calderara, Francesco Solera, Rita Cucchiara, "Predicting the Driver's Focus of Attention: the DR(eye)VE Project", Jun. 6, 2018, 25 pages, https://arxiv.org/pdf/1705.03854.pdf.

* cited by examiner

METHODS AND SYSTEM FOR PREDICTING DRIVER AWARENESS OF A FEATURE IN A SCENE

TECHNICAL FIELD

The present disclosure generally relates to systems, computing devices, and methods carried out by the systems and devices, and more specifically, to systems, devices, and methods for predicting driver awareness of a feature in a scene.

BACKGROUND

Vehicles are often equipped with a driver-assistance system, which may be able to aid a driver of the vehicle by providing functions such as adaptive cruise control, lane departure warnings, lane centering, and collision avoidance. Many of these functions prevent operation of the vehicle outside of vehicle-operating parameters—for instance, to prevent the vehicle from colliding with a road agent such as a pedestrian, a bicyclist, or another vehicle. Operation of these functions may depend on a risk posed to the vehicle, such as a risk posed by a road agent. However, existing systems may not adequately estimate such risks.

SUMMARY

An embodiment of the present disclosure takes the form of a method that includes presenting, via a user interface, a video comprising a plurality of frames. Each frame comprises a respective scene representation of a scene at a respective time, and the scene representation in each frame comprises a respective representation of a feature in the scene. The method further includes presenting, for each frame via the user interface, a respective gaze representation of a driver gaze of a driver. The gaze representation for each frame comprises a respective representation of a location of the driver gaze within the scene at the time of the respective scene representation in the frame. The method also includes generating an awareness prediction via a neural network based on the location of the driver gaze within the scene at the time of the respective scene representation in each frame. The awareness prediction reflects a predicted driver awareness of the feature in the scene. The method additionally includes receiving, via the user interface, an awareness indication associated with the video and the respective gaze representation for each frame presented via the user interface, and includes training the neural network based on a comparison of the awareness prediction generated via the neural network with the awareness indication received via the user interface.

Another embodiment takes the form of a computing device that includes a processor and a non-transitory computer-readable storage medium comprising computing device instructions. The instructions, when executed by the processor, cause the computing device to present, via a user interface, a video comprising a plurality of frames. Each frame comprises a respective scene representation of a scene at a respective time, and the scene representation in each frame comprises a respective representation of a feature in the scene. The instructions further cause the computing device to present, for each frame via the user interface, a respective gaze representation of a driver gaze of a driver. The gaze representation for each frame comprises a respective representation of a location of the driver gaze within the scene at the time of the respective scene representation in the frame. The instructions also cause the computing device to generate an awareness prediction via a neural network based on the location of the driver gaze within the scene at the time of the respective scene representation in each frame. The awareness prediction reflects a predicted driver awareness of the feature in the scene. The instructions additionally cause the computing device to receive, via the user interface, an awareness indication associated with the video and the respective gaze representation for each frame presented via the user interface, and causes the computing device to train the neural network based on a comparison of the awareness prediction generated via the neural network with the awareness indication received via the user interface.

A further embodiment takes the form of a method that includes presenting, via a user interface, a video comprising a plurality of frames. Each frame comprises a respective scene representation of a scene at a respective time, and the scene representation in each frame comprises a respective representation of a feature in the scene. The method further includes presenting, for each frame via the user interface, a respective gaze representation of a driver gaze of a driver. The gaze representation for each frame comprises a respective representation of a location of the driver gaze within the scene at the time of the respective scene representation in the frame. The method also includes presenting, via the user interface, a request to estimate a driver awareness of the feature in the scene based on the video and the respective gaze representation for each frame, and includes receiving, via the user interface, an awareness indication associated with the request presented via the user interface. The method additionally includes generating an awareness prediction via a neural network based on the location of the driver gaze within the scene at the time of the respective scene representation in each frame. The awareness prediction reflects a predicted driver awareness of the feature in the scene. The method further includes training the neural network based on a comparison of the awareness indication received via the user interface and the awareness prediction generated via the neural network.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Systems, computing devices, and methods for predicting driver awareness of a feature in a scene are disclosed herein. In some embodiments, a training server presents, via a user interface, a video comprising a plurality of frames. Each frame comprises a respective scene representation of a scene at a respective time, and the scene representation in each frame comprises a respective representation of a feature in the scene. The training server additionally presents, for each frame via the user interface, a respective gaze representation of a driver gaze of a driver. The gaze representation for each frame comprises a respective representation of a location of the driver gaze within the scene at the time of the respective scene representation in the frame. The training server generates an awareness prediction via a neural network based on the location of the driver gaze within the scene at the time of the respective scene representation in each frame. The awareness prediction reflects a predicted driver awareness of the feature in the scene. The training server receives, via the user interface, an awareness indication associated with the video and the respective gaze representation for each frame presented via the user interface, and the training server trains the neural network based on a comparison of the awareness prediction generated via the neural network with the awareness indication received via the user interface.

By training the neural network based on the comparison of the awareness prediction with the awareness indication, the neural network could subsequently generate more-accurate awareness predictions that, when generated by a vehicle to which the neural network is deployed after training, may be used by the vehicle to estimate a risk posed to the vehicle and to control the vehicle in accordance with the estimated risk. Various embodiments of systems, computing devices, and methods for predicting driver awareness of a feature in a scene will now be described in detail with reference to the drawings.

Figure 1:
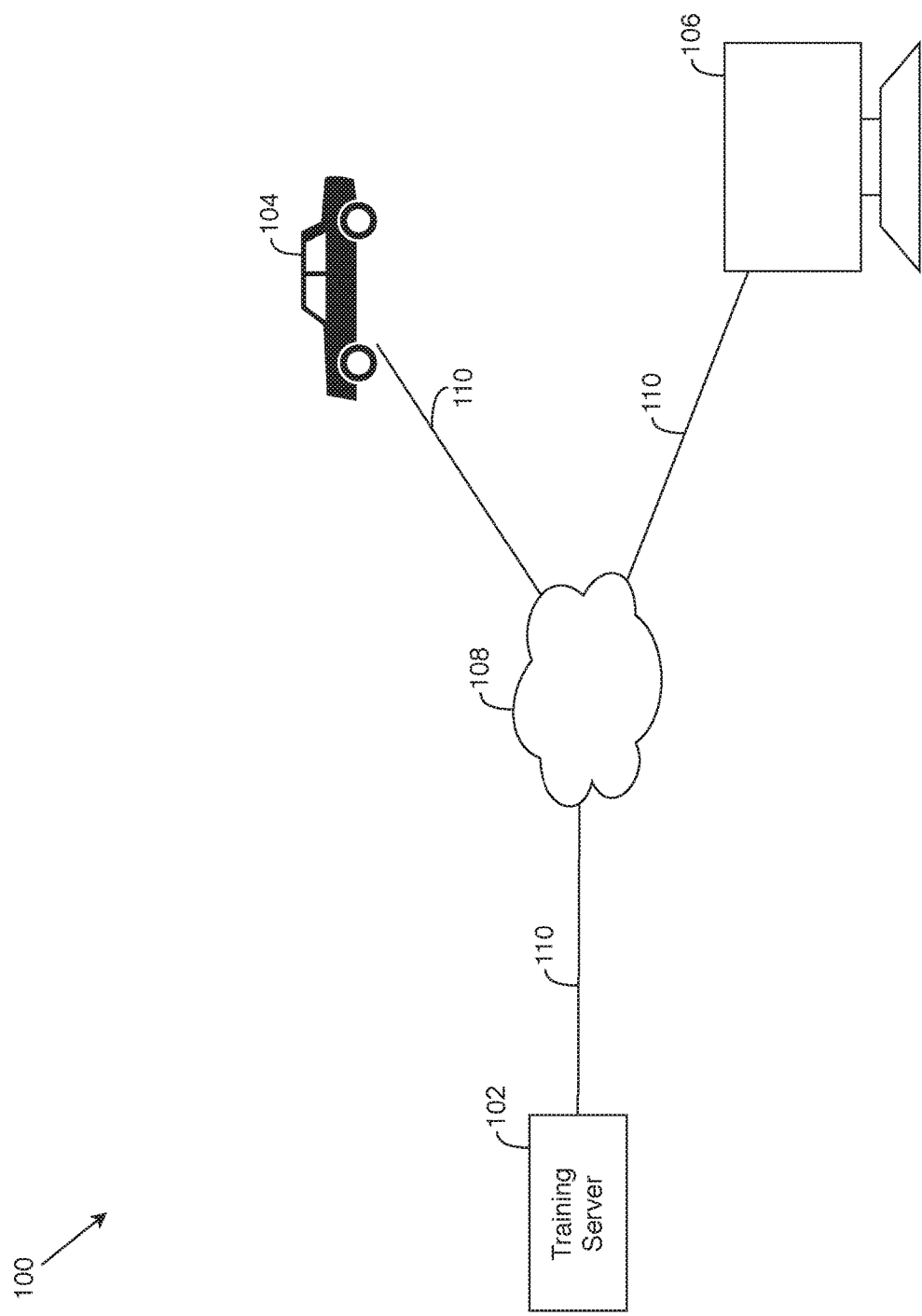
FIG. 1 depicts a system, according to one or more embodiments illustrated and described herein.

FIG. 1 depicts a system, according to one or more embodiments illustrated and described herein. As shown, a system 100 includes a training server 102, a vehicle 104, and a user terminal 106, each of which are communicatively connected via a network 108 and respective communication links 110 to network 108. In the embodiment of FIG. 1, training server 102, vehicle 104, and user terminal 106 each take the form of (or include) a respective computing device that includes a processor and a non-transitory computer-readable storage medium having computing device instructions that, when executed by the processor, cause the respective computing device (e.g., the server, vehicle, or user terminal) to execute the computing device functions described herein.

Training server 102 could take the form of a mainframe, a workstation, a terminal, a personal computer, a virtual machine, or any combination of these or other devices configured to carry out the training server functions described herein. Though system 100 is shown as including a single training server, it should be understood that the system could include multiple servers. Training server 102 is described in additional detail below.

Vehicle 104 could take the form of an autonomous vehicle, a semi-autonomous vehicle, or a manually-operated vehicle, among other possibilities. Vehicle 104 could include a computing device configured to carry out the vehicle functions described herein. In some embodiments, vehicle 104 takes the form of a training vehicle that is configured to provide sensor data to training server 102 (over network 108 via communication links 110) for training of a neural network executed by the training server. Additional aspects of vehicle 104 are described below.

User terminal 106 may be any entity capable of carrying out the user terminal functions described herein, and could take the form of (or include) a workstation, a terminal, a personal computer, a tablet device, a smartphone, or any combination of these, as just a few examples. The user terminal may include a user interface configured to output information to a user and/or receive input from the user. The output may be received (and/or the input provided) over network 108 via communication links 110. User terminal 106 may take other forms as well, and additional details of user terminal 106 are provided below.

Network 108 may include one or more systems and network infrastructure configured to facilitate communication between any one or more of training server 102, vehicle 104, and user terminal 106. Network 108 may take the form of (or include) one or more Wide-Area Networks (WANs), Local-Area Networks (LANs), the Internet, cellular networks, wired networks, wireless networks, or any combination of these or other networks. Network 108 may operate according to one or more communication protocols such as Ethernet, Wi-Fi, IP, TCP, or LTE, as examples. Though network 108 is shown as a single network, it should be understood that the network may include multiple, distinct networks that are communicatively linked. Network 108 could take other forms as well.

Communication links 110 may communicatively link respective entities with network 108 to facilitate communication between entities communicatively connected to the network, and could take the form of one or more wired and/or wireless communication links. Any of communication links 110 may be a combination of hardware and/or software, perhaps operating on one or more communication-link layers such as one or more physical, network, transport, and/or application layers. Additionally, communication links 110 may include one or more intermediate paths or systems, for example.

It should be understood that system 100 may include different and/or additional entities. For example, though system 100 is shown as including both a training server 102 and a user terminal 106, it should be understood that training server 102 and user terminal 106 could be combined—for example, into a given computing device. Moreover, one or more communication links may be absent, such as the communication link between vehicle 104 and network 108 shown in FIG. 1. Other variations are possible as well.

Figure 2:
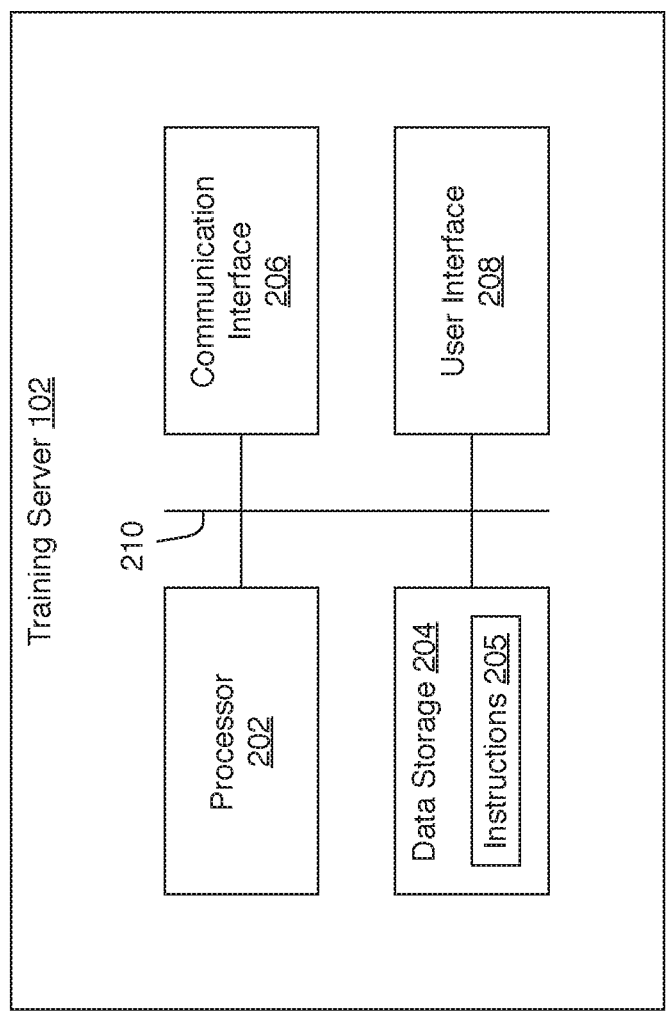
FIG. 2 depicts a block diagram of a training server, according to one or more embodiments illustrated and described herein.

FIG. 2 depicts a block diagram of a training server, according to one or more embodiments illustrated and described herein. As shown, training server 102 includes a processor 202, a data storage 204 including instructions 205, a communication interface 206, and a user interface 208, each of which are communicatively connected via a system bus 210.

Processor 202 may take the form of one or more general-purpose processors and/or one or more special-purpose processors, and may be integrated in whole or in part with data storage 204, communication interface 206, user interface 208, and/or any other component of training server 102, as examples. Accordingly, processor 202 may take the form of or include a controller, an integrated circuit, a microchip, a central processing unit (CPU), a microprocessor, a system on a chip (SoC), a field-programmable gate array (FPGA), and/or an application-specific integrated circuit (ASIC), among other possibilities.

Data storage 204 may take the form of a non-transitory computer-readable storage medium such as a hard drive, a solid-state drive, an erasable programmable read-only memory (EPROM), a universal serial bus (USB) storage device, a compact disc read-only memory (CD-ROM) disk, a digital versatile disc (DVD), a relational database management system (RDBMS), any other non-volatile storage, or any combination of these, to name just a few examples.

Instructions 205 may be stored in data storage 204, and may include machine-language instructions executable by processor 202 to cause training server 102 to perform the training server functions described herein. Additionally or alternatively, instructions 205 may include script instructions executable by a script interpreter configured to cause processor 202 and training server 102 to execute the instructions specified in the script instructions. In an embodiment, the instructions include instructions executable by the processor to cause training server 102 to execute a neural network. It should be understood that instructions 205 may take other forms as well.

Additional data may be stored in data storage 204, such as one or more images, videos, scene representations, gaze representations, awareness indications, and/or sensor data, as will be described in further detail below. The additional data could be stored as a table, a flat file, data in a file system of the data storage, a heap file, a B+ tree, a hash table, a hash bucket, or any combination of these, as examples.

Communication interface 206 may be any component capable of performing the communication interface functions described herein, including facilitating wired and/or wireless communication between training server 102 and another entity of system 100, such as vehicle 104 and/or user terminal 106. As such, communication interface 206 could take the form of an Ethernet, Wi-Fi, Bluetooth, and/or USB interface, among many other examples. Communication interface 206 may receive data over network 108 via communication links 110, for instance.

User interface 208 may be any component capable of carrying out the user interface functions described herein. For example, the user interface may be configured to receive input from a user and/or output information to the user. Output may be provided via a computer monitor or other display device, a loudspeaker (such as a computer speaker), or another component of (or communicatively linked to) training server 102. User input might be achieved via a keyboard, a mouse, or other component communicatively linked to the training server. As another possibility, input may be realized via a touchscreen display of the training server. Some components may provide for both input and output, such as the aforementioned touchscreen display. User interface 208 could include a graphics processing unit (GPU), a video card, a display interface connector, instructions (e.g., among instructions 205) that cause training server 102 and user interface 208 to carry out the described user interface functions, or any combination of these or other user interface components. User interface 208 may take numerous other forms as well, and is described in additional detail below.

System bus 210 may be any component capable of performing the system bus functions described herein. In an embodiment, system bus 210 is any component configured to transfer data between processor 202, data storage 204, communication interface 206, user interface 208, and/or any other component of training server 102. In an embodiment, system bus 210 includes a traditional bus as is known in the art. In other embodiments, system bus 210 includes a serial RS-232 communication link, a USB communication link, and/or an Ethernet communication link, alone or in combination with a traditional computer bus, among numerous other possibilities. In some examples, system bus 210 may be formed from any medium that is capable of transmitting a signal, such as conductive wires, conductive traces, or optical waveguides, among other possibilities. Moreover, system bus 210 may be formed from a combination of mediums capable of transmitting signals. It should be understood that system bus 210 may take various other forms as well.

It should be understood that training server 102 may include different and/or additional components, and some or all of the functions of a given component could instead be carried out by one or more different components. For example, training server 102 may include communication interface 206 but not user interface 208, or may include user interface 208 but not communication interface 206.

Figure 3:
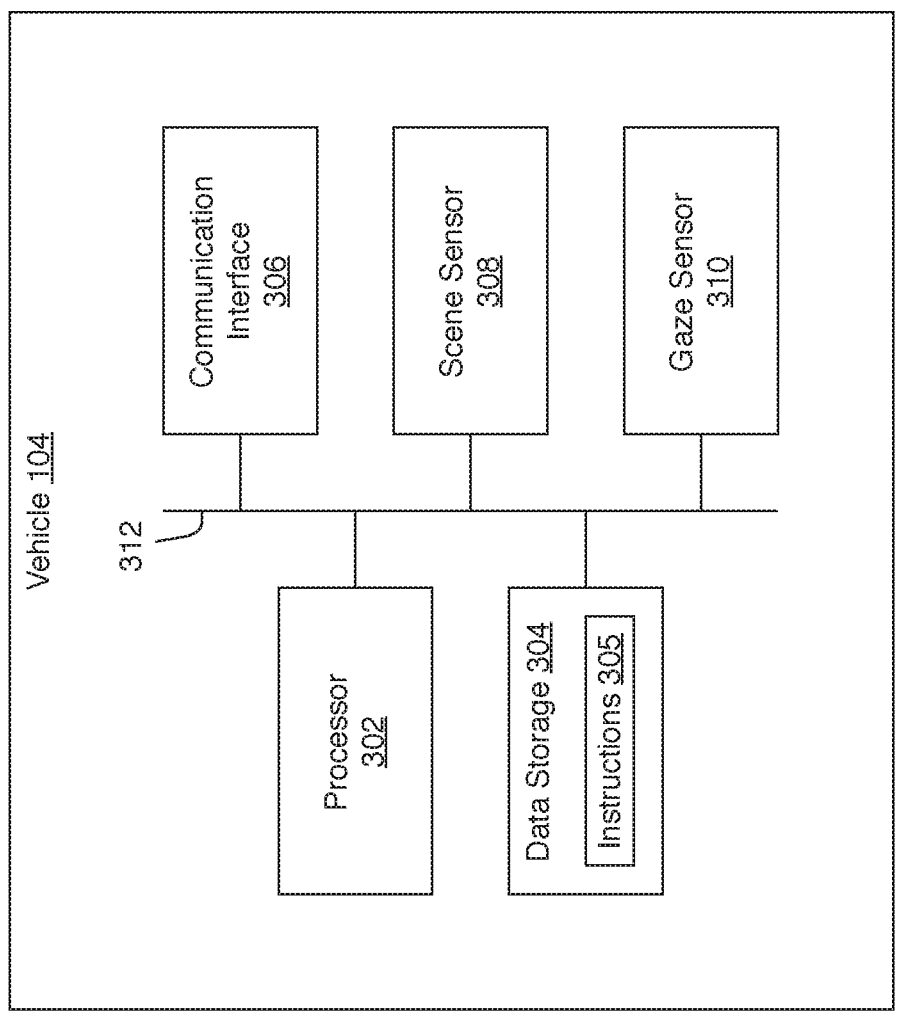
FIG. 3 depicts a block diagram of a vehicle, according to one or more embodiments illustrated and described herein.

FIG. 3 depicts a block diagram of a vehicle, according to one or more embodiments illustrated and described herein. As shown, vehicle 104 includes a processor 302, a data storage 304 including instructions 305, a communication interface 306, a scene sensor 308, and a gaze sensor 310, each of which are communicatively connected via a system bus 312. Those of skill in the art will appreciate that vehicle 104 may include different and/or additional components, and some or all of the functions of a given component could instead be carried out by one or more different components.

Processor 302, data storage 304, and communication interface 306 may take forms similar to processor 202, data storage 204, and communication interface 206, respectively, as described above with reference to FIG. 2, among other possibilities. Data storage 304 could store sensor data, images, videos, or other data generated by vehicle 104 and/or output by scene sensor 308 or gaze sensor 310 (or both), among other possibilities. Instructions 305, when executed by processor 302, may cause vehicle 104 to execute the vehicle functions described herein. System bus 312 could take the form of (or include) a vehicle bus, such as a local interconnect network (LIN) bus, a controller area network (CAN) bus, a vehicle area network (VAN) bus, or any combination of these or mediums.

Scene sensor 308 may be configured to output sensor data, images, videos, or other data representative of a scene from a perspective of the scene sensor. For example, scene sensor 308 could take the form of (or include) a radar sensor, a lidar sensor, and/or a camera. The radar sensor and/or the lidar sensor may send a signal (such as pulsed laser light, radio waves, or other electromagnetic radiation) and may obtain a distance measurement from the sensor to the surface of an object based on a time of flight of the signal—that is, the time between when the signal is sent and when the reflected signal (reflected by the object surface) is received by the sensor. The camera may collect light or other electromagnetic radiation and may generate an image or other data based on the collected light. Scene sensor 308 may be mounted to vehicle 104, and the perspective of the scene sensor could be similar to the perspective of a driver of the vehicle. Scene sensor 308 may take other forms as well.

Gaze sensor 310 may be configured to output sensor data, images, videos, or other data representative of a gaze of a driver of vehicle 104. Gaze sensor 310 could take the form of a radar sensor, lidar sensor, or a camera, as described above with respect to scene sensor 308, or could take the form of another sensor. In some embodiments, data output by gaze sensor 310 includes data representative of a face of the driver or the eyes of the driver, among other possibilities.

Figure 4:
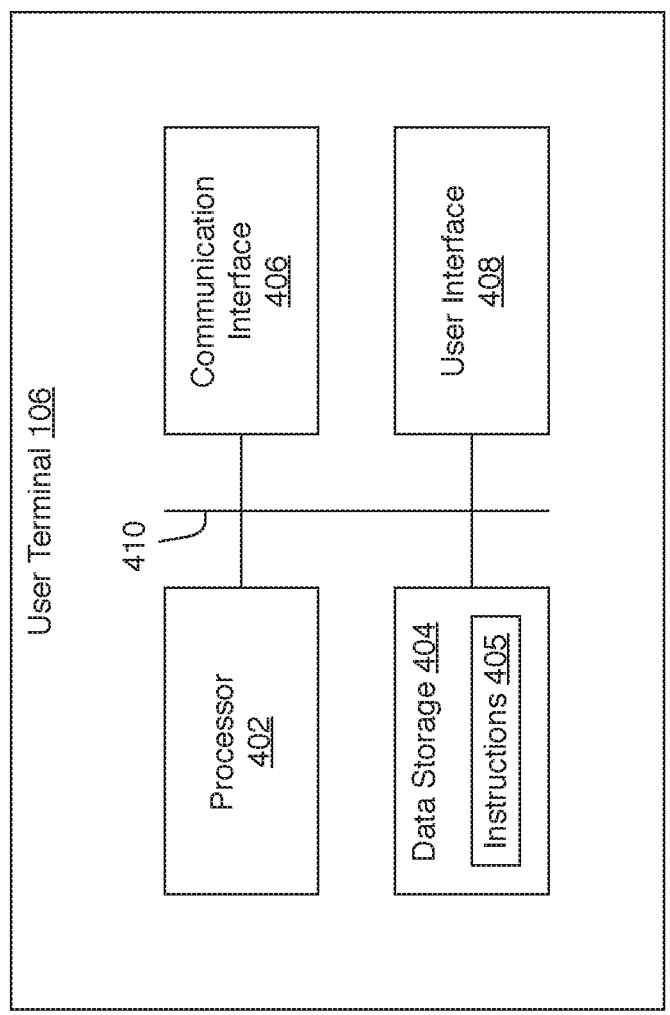
FIG. 4 depicts a block diagram of a user terminal, according to one or more embodiments illustrated and described herein.

FIG. 4 depicts a block diagram of a user terminal, according to one or more embodiments illustrated and described herein. As shown, user terminal 106 includes a processor 402, a data storage 404 including instructions 405, a communication interface 406, and a user interface 408, each of which are communicatively connected via a system bus 410. Those of skill in the art will appreciate that user terminal 106 may include different and/or additional components, and some or all of the functions of a given component could instead be carried out by one or more different components.

Processor 402, data storage 404, and communication interface 406 may take forms similar to processor 202, data storage 204, and communication interface 206, respectively, as described above with reference to FIG. 2, and/or forms similar to processor 302, data storage 304, and communication interface 306, respectively, as described above with reference to FIG. 3, among other possibilities. Likewise, user interface 408 could take a form similar to user interface 208 of training server 102, as described above with reference to FIG. 2. Instructions 405, when executed by processor 402, may cause user terminal 106 to execute the user terminal functions described herein.

Figure 5:
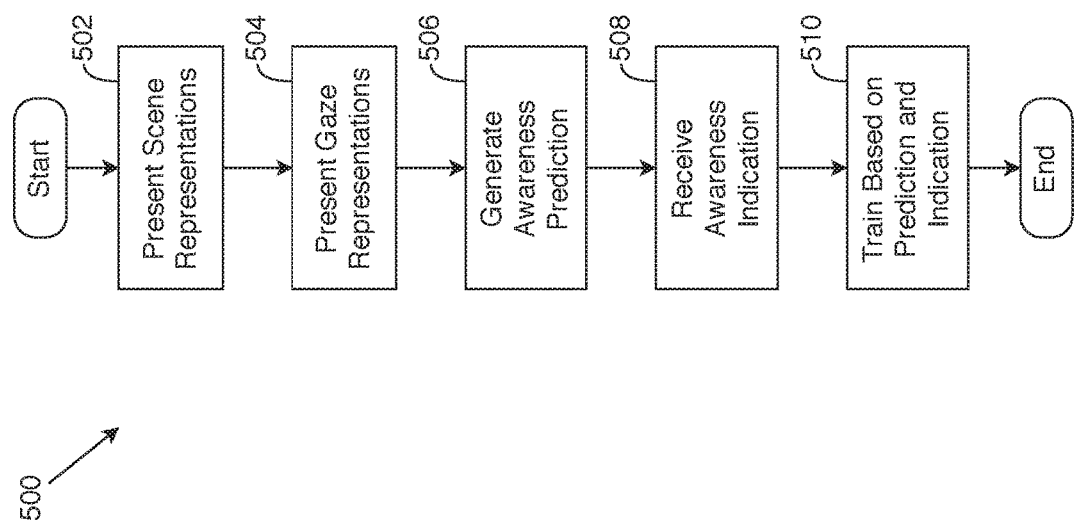
FIG. 5 depicts a flowchart of a method, according to one or more embodiments illustrated and described herein.

FIG. 5 depicts a flowchart of a method, according to one or more embodiments illustrated and described herein. Though the method is described as being carried out by training server 102, it will be appreciated that the method could be carried out by another component or combination of components, such as one or more other computing devices.

As shown, a method 500 begins at step 502 with training server 102 presenting, via a user interface, a video including a plurality of frames, each frame taking the form of (or including) a respective scene representation of a scene at a respective time. The scene representation in each frame includes a respective representation of a feature in the scene.

Figure 6:
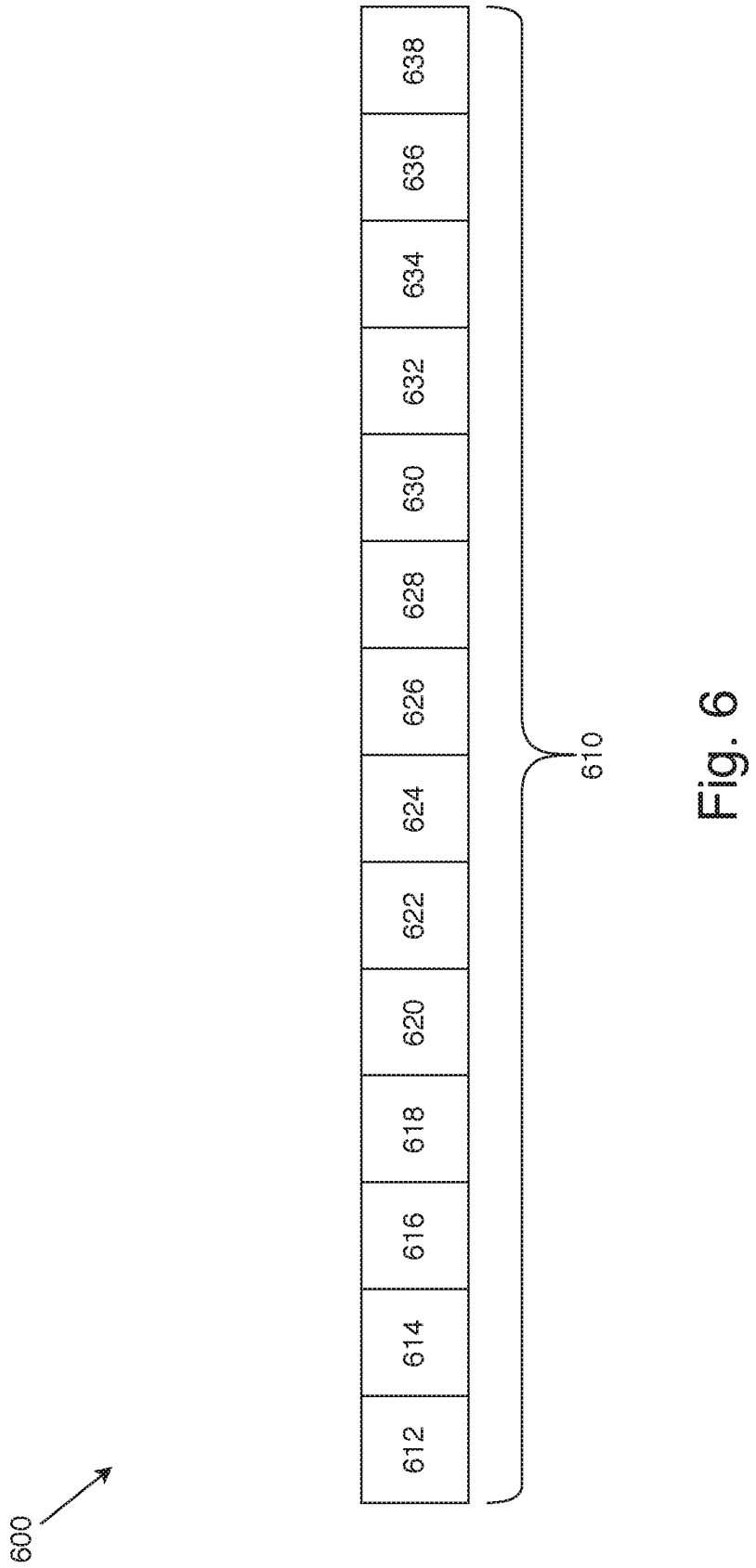
FIG. 6 depicts a video, according to one or more embodiments illustrated and described herein.

FIG. 6 depicts a video, according to one or more embodiments illustrated and described herein. As shown, a video 600 includes a plurality 610 of frames, which in turn includes frames 612 to 638. Each of the plurality 610 of frames takes the form of (or includes) a respective scene representation of a scene. The scene represented by the respective scene representations may be a scene in which vehicle 104 was present, and may include a road such as a highway or other roadway, perhaps with one or more road agents traveling on the road, as examples. Road agents may include, for instance, pedestrians, bicyclists, and other vehicles, among other possibilities. The road could include a single lane, or could include multiple lanes. Additionally or alternatively, the scene may include sidewalks or crosswalks, and the one or more road agents could travel on the sidewalks or crosswalks instead of (or in addition to) traveling on the road. The scene might include one or more traffic signs or signaling devices, such as stop signs, yield signs, and traffic lights, which may be present at one or more intersections or crosswalks, as examples. Road depressions (e.g., potholes), road debris (e.g., tire treads), and other features may also be present in the scene. It will be appreciated by those of skill in the art that the scene could include any combination of these or other features, and that video 600 (including the plurality 610 of frames) could take other forms as well.

Figure 7:
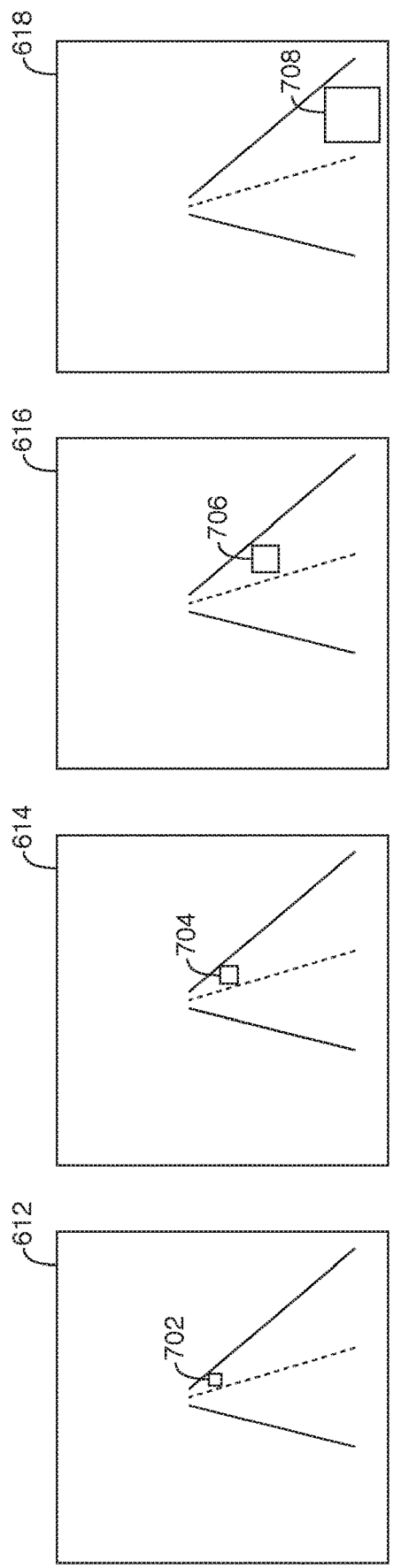
FIG. 7 depicts respective scene representations in frames of a video, according to one or more embodiments illustrated and described herein.

FIG. 7 depicts respective scene representations in frames of a video, according to one or more embodiments illustrated and described herein. As shown, frame 612, frame 614, frame 616, and frame 618 each include a respective scene representation of a scene at a respective time. Plurality 610 of frames may take the form of a sequence of frames, ordered according to the times of the respective scene representations in the frames. In the illustrated embodiment, the scene includes a two-lane road on which vehicle 104 is traveling at the respective times of the scene representations in the frames. Specifically, vehicle 104 is traveling in the left lane of the road.

In an embodiment, the scene representation in each of the plurality 610 of frames is a respective representation of the scene from a perspective of scene sensor 308—for example, an image sensor—mounted to vehicle 104. The representations of the scene from the perspective of the image sensor or other scene sensor may reflect or approximate the scene from the perspective of the driver of vehicle 104. Accordingly, scene sensor 308 may be mounted to vehicle 104 so as to reflect or approximate the perspective of the driver.

As shown in FIG. 7, the scene includes a feature (in this example, a road agent in the right lane of the road), and the scene representation in frame 612, frame 614, frame 616, and frame 618 includes a feature representation 702, a feature representation 704, a feature representation 706, and a feature representation 708 of the feature in the scene, respectively. As shown, the position of the respective feature representations of the feature is different in each of the frames, reflecting that the position of the vehicle, and/or the position of the feature in the scene from the perspective of the driver (as reflected or approximated by the perspective of gaze sensor 310), is moving over time. Though the feature represented by feature representation 702, feature representation 704, feature representation 706, and feature representation 708 is described as a road agent, it will be appreciate that the feature could take the form of any other feature, so as an object in the scene. In an embodiment, video 600 is presented via a user interface, which will be described in additional detail below.

With reference again to FIG. 5, at step 504, training server 102 presents, via the user interface and for each of the plurality of frames of the video presented at step 502, a respective gaze representation of a driver gaze of a driver, such as a driver of vehicle 104. The gaze representation for each frame includes a respective representation of a location of the driver gaze within the scene at the time of the respective scene representation in the frame.

Figure 8:
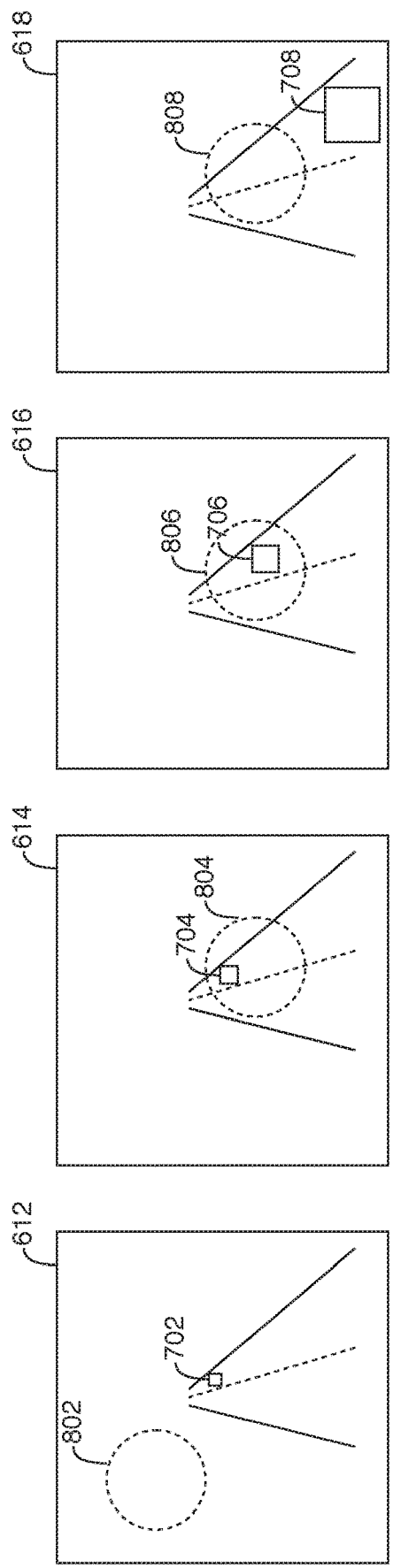
FIG. 8 depicts respective gaze representations for the frames that include the scene representations depicted in FIG. 7, according to one or more embodiments illustrated and described herein.

FIG. 8 depicts respective gaze representations for the frames that include the scene representations depicted in FIG. 7, according to one or more embodiments illustrated and described herein. As shown, a gaze representation 802, a gaze representation 804, a gaze representation 806, and a gaze representation 808 are gaze representations for frame 612, frame 614, frame 616, and frame 618, respectively, which include the above-described scene representations. Gaze representation 802, gaze representation 804, gaze representation 806, and gaze representation 808 take the form of (or include) a respective location of the driver gaze within the scene at the time of the scene representation in frame 612, frame 614, frame 616, and frame 618, respectively. The gaze representation could take the form of a circle or other shape representing a boundary (such as an actual or approximated boundary) of a field of view of the driver within the scene, as illustrated in FIG. 8, though other representations of the locations of the driver gaze are possible as well.

In some embodiments, the gaze representations are overlaid on the frames. As an example, the respective scene representation in each of the frames could take the form of (or include) a respective image that includes multiple pixels, and the respective gaze representation for each of the frames could take the form of (or include) one or more pixels (of the respective image) that collectively form a shape or other representation of the location of the driver gaze within the scene at the time of the respective scene representation in the frame. As another possibility, the gaze representation for each of the frames could take the form of a respective representation overlaid (e.g., rendered) by the user interface based on respective gaze location data for the frame. For instance, if the respective scene representation in each of the frames takes the form of (or includes) a respective image, then the respective gaze location data for each of the frames could indicate one or more coordinate locations in the image (e.g., an x position and a y position) that correspond to the location of the driver gaze (e.g., a boundary of a field of view of the driver) at the time of the respective scene representation in the frame. The user interface could overlay the gaze representations on the frames (e.g., by rendering the above-described boundary or other representation) at the coordinate locations indicated in the gaze location data. Other examples are possible as well without departing from the scope of the disclosure.

It should be understood from the above description that step 502 and step 504 of method 500 may be carried out concurrently. For instance, the respective gaze representation for each frame may be presented concurrently with the frame. Either or both of the video and the gaze representations presented at step 502 and step 504, respectively, may be based on data received from vehicle 104.

In an example, vehicle 104 may collect sensor data from scene sensor 308, gaze sensor 310, or both, and the vehicle may send the collected sensor data to training server 102, which may receive the sensor data from the vehicle and then generate video 600 based on the received sensor data. As another possibility, vehicle 104 may obtain one or more images from scene sensor 308 and/or gaze sensor 310, or may generate one or more images based on sensor data collected from the scene sensor and/or the gaze sensor, and the vehicle may send the images to training server 102. The training server may receive the images from vehicle 104, and may generate video 600 based on the received images. As a further possibility, vehicle 104 may generate video 600 based on images obtained, or sensor data collected, from scene sensor 308 and/or gaze sensor 310. The vehicle may send the generated video to training server 102, which is correspondingly received by the training server. The video, the images, and/or the sensor data may be send to training server 102 by vehicle 104 over network 108 and communication links 110 via communication interface 306, and the training server may receive the video, images, and/or sensor data from the vehicle over the network and the communication links via communication interface 206 of the training server.

In another example, training server 102 may receive sensor data, images, or video from vehicle 104 via a removable data storage to which the sensor data, images, or video were previously transferred. The removable data storage could be communicatively connected to the training server (e.g., connected to communication interface 206 of the training server) over a Universal Serial Bus (USB) interface connection, an IEEE 1394 (FireWire) interface connection, a Thunderbolt interface connection, or other storage interface connection. Other examples are possible as well without departing from the scope of the disclosure.

Figure 9:
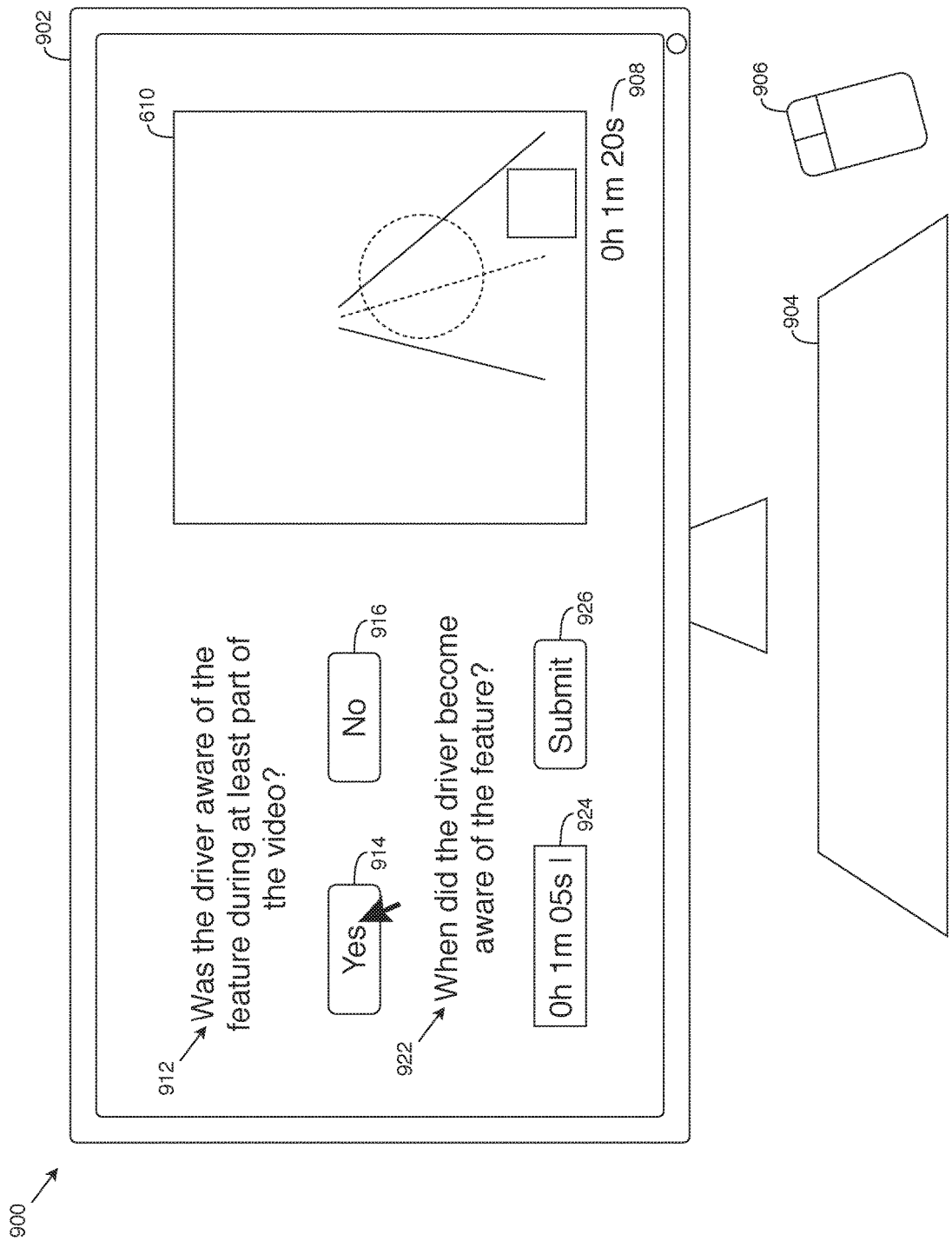
FIG. 9 depicts a presentation of the scene representations and the gaze representations depicted in FIG. 7 and FIG. 8, according to one or more embodiments illustrated and described herein.

FIG. 9 depicts a presentation of the scene representations and the gaze representations depicted in FIG. 7 and FIG. 8, according to one or more embodiments illustrated and described herein. As shown, a presentation 900 includes a presentation, via a display device 902 of a user interface, of plurality 610 of frames of video 600. In the illustrated embodiment, the frames are presented sequentially (e.g., as a moving picture represented by video 600), and the respective gaze representations for the frames are presented concurrently with the frames (e.g., overlaid on the moving picture represented by the video). Presentation 900 further includes a presentation of a timestamp 908 that identifies the respective time of the scene representation of the frame presented via the user interface. Alternatively (or in addition), one or more of the frames could be presented simultaneously—for example, side by side in a horizontal or vertical layout (or both)—and presentation 900 could include presentations of respective timestamps identifying the respective times of the scene representations of the simultaneously-presented frames. Other examples are possible as well.

Presenting the video at step 502 may include presenting an identification of the feature represented in the scene representations of the plurality 610 of frames. For instance, the representation of the feature in each of the frames (i.e., the representation of the feature in the respective scene representation in each of the frames) may include a textual identification of the feature, such as text presented via the user interface identifying the feature as "the red vehicle traveling in the right lane" or "the pedestrian crossing the intersection," as examples. As another possibility, the representation of the feature in each of the frames may include a respective identification of the feature in each of the frames. For instance, the identification could take the form of a respective representation of an arrow, a bounding box (or other bounding geometric shape), or other indicia of the feature. The identification of the feature may be presented based on feature identification information for the feature, which could include a semantic segmentation of the video (and the respective scene representations in the frames of the video) generated via a neural network. In an embodiment, the feature identification information is provided by a user. For instance, an awareness indication received via a user interface (as will be described in additional detail below) could include an identification of the feature. In such an embodiment, the video could be presented at step 502 without presenting an identification of the feature, since the received awareness indication includes an identification of the feature. Other examples are possible as well.

In an embodiment, the user interface (via which the scene representations and the gaze representations are presented) takes the form of user interface 208 of training server 102. For example, display device 902 may be communicatively connected to user interface 208 of training server 102 via a High-Definition Multimedia Interface (HDMI) connection, a DisplayPort interface connection, a Digital Visual Interface (DVI) connection, a Video Graphics Array (VGA) interface connection, or another display interface connection, and the scene representations and the gaze representations may be presented via the display device communicatively connected to the user interface of the training server.

In another embodiment, the user interface takes the form of user interface 408 of user terminal 106. For example, display device 902 may be communicatively connected to user interface 408 of user terminal 106 via a display interface connection as described above, and training server 102 may be communicatively connected to the user terminal (e.g., to communication interface 406 of the user terminal) over network 108 and communication links 110 via communication interface 206 of the training server. In such an embodiment, presenting the video may include sending the video to user interface 408 over network 108, perhaps using a communication protocol such as TCP, HyperText Transfer Protocol (HTTP), Real-Time Transport Protocol (RTP), HTTP Live Streaming (HLS), or other communication protocol. Presenting the video may further include sending instructions to user interface 408 (e.g., over network 108) to present the video. The instructions could take the form of, for example, a HyperText Markup Language (HTML) tag, JavaScript instructions, or a combination of these or other instructions. Presenting the gaze representations could similarly include sending instructions to user interface 408 to present the gaze representations.

It will be appreciated that presentation 900 could include different and/or additional presentations or other aspects, and that the user interface could take a form other than user interface 208 or user interface 408. Additional details regarding presentation 900 are provided below.

Referring again to FIG. 5, at step 506, training server 102 generates an awareness prediction via a neural network based on the location of the driver gaze within the scene at the time of the respective scene representation in each frame. The awareness prediction reflects a predicted driver awareness of the feature in the scene. The predicted driver awareness, in turn, may reflect a definition of driver awareness learned by the neural network during training of the neural network, as will be described in additional detail below along with additional detail regarding the neural network and generated of the awareness prediction.

At step 508 shown in FIG. 5, training server 102 receives, via the user interface, an awareness indication associated with the video and the respective gaze representation for each frame presented via the user interface at step 502 and step 504. The awareness indication could be provided to the user interface by a user, and may reflect a determination or an estimation by the user of a driver awareness of the feature in the scene. For example, training server 102 may present, via the user interface, a request to estimate a driver awareness of the feature in the scene based on the video and the respective gaze representation for each frame (as presented at step 502 and step 504). The training server may receive, via the user interface, an awareness indication associated with the request to estimate the driver awareness of the feature, and the awareness indication could accordingly reflect an estimation (by the user) of a driver awareness of the feature as requested.

In the embodiment described previously with reference to FIG. 9, the feature is represented in the respective scene representations of plurality 610 of frames of video 600 presented via the user interface at step 502. In one such embodiment, presentation 900 further includes a presentation 912 or a presentation 922 (or both) via the user interface, the presentation including a request to estimate a driver awareness of the feature based on video 600 (e.g., plurality 610 of frames) and on the respective gaze representation for each of the frames presented via the user interface.

The request to estimate the driver awareness could include a request to estimate whether the driver was aware of the feature during at least part of the time period over which the scene is represented in the video presented via the user interface. As shown in FIG. 9, presentation 900 could include a presentation 912 of such a request via the user interface. In an embodiment where the video includes a representation of the scene over a given time period, the awareness indication received at step 508 could take the form of (or include) an indicated estimation of whether the driver was aware of the feature in the scene during at least part of the given time period (e.g., as requested by presentation 912). For example, as illustrated in FIG. 9, presentation 900 could include a YES button 914 presented via the user interface and a NO button 916 presented via the user interface. The received awareness indication could take the form of (or include) an indication, received via a selection of YES button 914, estimating that the driver was aware of the feature during at least part of the given time period. Alternatively, the awareness indication could take the form of (or include) an indication, received via a selection of NO button 916, estimating that the driver was not aware of the feature during at least part of the given time period. The selection of YES button 914 or NO button 916 could be received via a keyboard 904 of the user interface, a mouse 906 of the user interface, or both, as examples.

As another possibility, the request to estimate the driver awareness could include a request to estimate when the driver became aware of the feature during the time period over which the scene is represented in the presented video (for example, if training server 102 receives an indication that the driver was aware of the feature during at least part of the time period). Presentation 900 could include a presentation 922 of such a request via the user interface, as shown in FIG. 9. The awareness indication received at step 508 could take the form of (or include) an indicated estimation of when the driver became aware of the feature in the scene during the given time period (e.g., as requested by presentation 922). For example, as illustrated in FIG. 9, presentation 900 could include a text entry box 924 presented via the user interface and a SUBMIT button 926 presented via the user interface. The received awareness indication could take the form of (or include) an indication, received via text entry into text entry box 924 and selection of SUBMIT button 926, estimating when the driver became aware of the feature in the scene during the given time period. Text entry into text entry box 924 could be received via keyboard 904, and selection of SUBMIT button 926 could be received via the keyboard and/or mouse 906, among other possibilities.

As a further possibility, the request to estimate the driver awareness could include a request to estimate whether the driver perceived (e.g., physically or visually perceived) the feature in the scene during at least part of the given time period, even if the driver was not aware of the feature during the time period. Such a request could be presented if, for example, training server 102 receives an indication (via the user interface, for instance) that the driver was not aware of the feature during the time period. The awareness indication received at step 508 could take the form of (or include) an indicated estimation of whether the driver perceived the feature in the scene during at least part of the given time period. The driver might perceive the feature but nevertheless be unaware of the feature if, for example, the feature is inconspicuous or obscured as a result of the presence of other features in proximity to the feature (e.g., obscured by other vehicles in proximity to a pedestrian in the scene).

In an embodiment, the user interface (via which the awareness indication is received at step 508) takes the form of user interface 208 of training server 102, and receiving the awareness indication at step 508 includes receiving the awareness indication via keyboard 904, mouse 906, or another input device communicatively connected to user interface 208 via a human interface device (HID) connection such as a USB HID connection. In another embodiment, the user interface takes form of user interface 408 of user terminal 106, and receiving the awareness indication includes training server 102 sending instructions to user interface 408 (e.g., over network 108 and communication links 110 via communication interface 206 of the training server) to send an indication received via user interface 408 (e.g., from a user) to the training server. In such an embodiment, the awareness indication takes the form of the indication sent by user interface 408 and received by training server 102 (e.g., via communication interface 206).

A request—to estimate, based on the video and the respective gaze representation for each frame, a driver awareness of the feature in the scene—may be presented via the user interface in a manner similar to the presentation of the video at step 502 and/or the gaze representations at step 504. For instance, the user interface could take the form of user interface 208 of training server 102, and presenting the request could include presenting the request via display device 902 communicatively connected to user interface 208 via a display interface connection (such as an HDMI connection). As another possibility, the user interface could take the form of user interface 408 of user terminal 106, and presenting the request may include training server 102 sending instructions to user interface 408 (e.g., over network 108 and communication links 110 via communication interface 206 of the training server) to present the request.

With reference again to FIG. 5, at step 510, training server 102 trains the neural network based on a comparison of the awareness prediction generated via the neural network at step 506 with the awareness indication received via the user interface at step 508.

Figure 10:
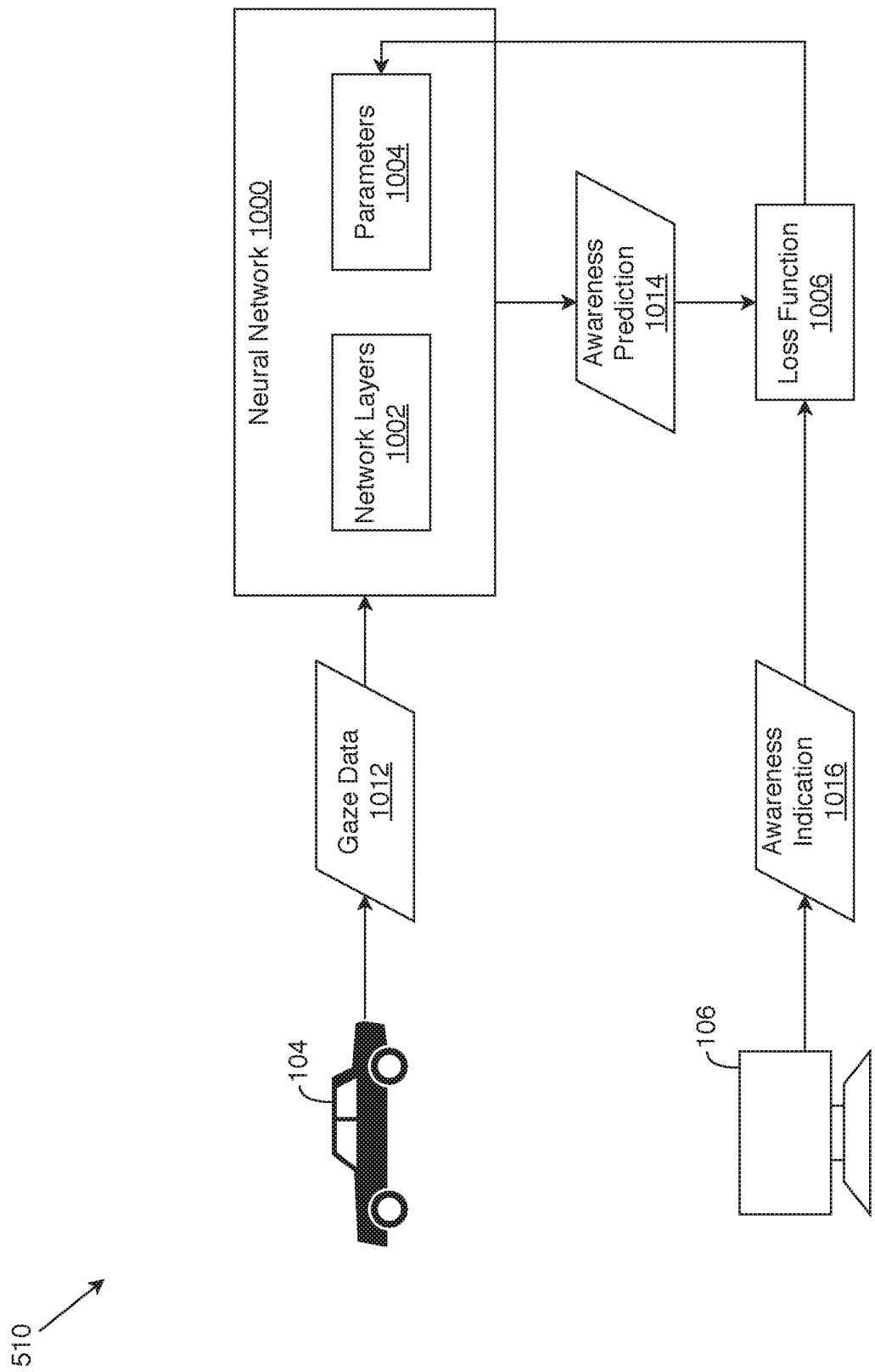
FIG. 10 depicts aspects of a neural network, according to one or more embodiments illustrated and described herein.

FIG. 10 depicts aspects of a neural network, according to one or more embodiments illustrated and described herein. As shown, a neural network 1000 includes one or more network layers 1002 and one or more network parameters 1004. The neural network generates an awareness prediction 1014 based on gaze data 1012, which could include data that indicates the location of the driver gaze within the scene at the time of the respective scene representation in each of the plurality 610 of frames. The neural network could generate the awareness prediction via network layers 1002, which in turn may generate the awareness prediction based on network parameters 1004. In some embodiments, training server 102 (or another entity or computing device such as vehicle 104) generates awareness prediction 1014 via neural network 1000 based on gaze data 1012.

In an embodiment, training server 102 generates awareness prediction 1014 via neural network 1000 at step 506. The awareness prediction is generated based on the location of the driver gaze within the scene at the time of the respective scene representation in each of the plurality 610 of frames. Additionally (or alternatively), the awareness prediction may be generated based on plurality 610 of frames in video 600, the respective gaze representations for the plurality of frames, or a combination of these, among other examples. According to the embodiment, training server 102 receives an awareness indication 1016 (as shown in FIG. 10) via the user interface at step 508. At step 510, training server 102 trains neural network 1000 based on a comparison of awareness prediction 1014 with awareness indication 1016.

In one such embodiment, training neural network 1000 based on the comparison of awareness prediction 1014 with awareness indication 1016 includes updating network parameters 1004 based on the comparison. As indicated previously, awareness predictions may be generated by the neural network via network layers 1002, and because the network predictions may be generated by the network layers based on network parameters 1004, subsequent awareness predictions (after training of the neural network) may reflect the training based on the comparison of the awareness prediction with the awareness indication.

Training neural network 1000 based on a comparison of awareness prediction 1014 with awareness indication 1016 may include comparing the awareness prediction with the awareness indication via a loss function 1006 shown in FIG. 10. The loss function may compare the awareness prediction with the awareness indication, which may include generating a loss value reflecting a difference between the awareness prediction and the awareness indication. The loss function may then update network parameters 1004 based on the generated loss value (i.e., based on the difference between the awareness indication and the awareness prediction). Subsequently, the loss function may compare another awareness prediction generated via the neural network with another awareness indication received via the user interface, and may again update network parameters 1004 based on a generated loss value reflecting a difference between the other awareness prediction and the other awareness indication. Loss function 1006 may update network parameters 1004 such that, over a plurality of updates to the network parameters based on differences between still more awareness predictions and awareness indications, the differences between awareness predictions (generated via neural network 1000) and awareness indications (received via the user interface) become smaller. Accordingly, over the plurality of updates to the network parameters, awareness predictions reflecting predicted driver awareness of features in scenes, as generated via neural network 1000, may become more consistent with awareness indications that reflect estimations (by users of the user interface) of driver awareness of the features in the scenes. In an embodiment, training server 102 generates the awareness prediction at step 506 via a previously-trained neural network, and the training of the neural network by the training server at step 508 includes additional training of the previously-trained neural network.

In an embodiment, the video presented at step 502 takes the form of (or includes) a representation of the scene over a first time period, and the awareness prediction is generated at step 506 based on a driver gaze pattern of the driver over a second time period that takes the form of (or includes) the first time period. The driver gaze pattern includes the driver gaze at the time of the respective scene representation in each frame. To illustrate, plurality 610 of frames presented via the user interface might include sixty frames that collectively represent a three second time period. The awareness indication received at step 508 may thus reflect an estimate, by a user of the user interface, that is based on the locations of the driver gaze at the sixty different times over the three second time period. The awareness prediction, in contrast, could be generated based on a driver gaze pattern over a time period that is longer (or at least no shorter) than the three second time period represented by the sixty frames. Even if the time period of the driver gaze pattern is coextensive with the three second time period presented by the sixty frames, the driver gaze pattern may include data indicating locations of the driver gaze at other times within the three second time period, such as times that are between the times of the scene representations in the plurality of frames. Therefore, the awareness prediction generated at step 506 could be based on additional information (regarding the driver gaze) than is available to a user that provides the awareness indication to the user interface. Alternatively, the awareness prediction could be generated based on a driver gaze pattern over a period of time that is shorter than the three second time period (or other time period) represented by the sixty frames (or other number of frames) in plurality 610 of frames, such that the awareness prediction generated at step 506 is generated based on perhaps less information (regarding the driver gaze) than is available to a user that provides the awareness indication to the user interface. Other variations are possible as well.

In an embodiment, subsequent to training of the neural network at step 510, a vehicle (e.g., vehicle 104) executes the neural network (e.g., an instance of the neural network) at the vehicle. A driver gaze pattern of a second driver (e.g., a driver different from that described with respect to steps 502 to 510 above) is detected by a sensor of the vehicle, the driver gaze pattern reflecting locations of a gaze of the second driver within a second scene at respective times during a given time period.

In such an embodiment, a second awareness prediction (different from the awareness prediction generated at step 506) is generated via the neural network executed at the vehicle. The second awareness prediction is generated based on the driver gaze pattern of the second driver, and the second awareness prediction reflects a predicted driver awareness of a feature in the second scene. A risk estimation—of a risk posed to the vehicle by the feature in the second scene—is generated at the vehicle based on the second awareness prediction, and the vehicle is controlled in accordance with the risk estimation. Controlling the vehicle could include the vehicle performing an intervention—for example, by executing a collision avoidance function to avoid a collision with the feature (e.g., a road agent) of which the driver may be unaware but which may pose a risk to the vehicle. Controlling the vehicle could include the vehicle controlling a different vehicle function or vehicle functions (perhaps in addition to the collision avoidance function). Accordingly, the vehicle can be controlled based on the second awareness prediction, which reflects a predicted driver awareness of the feature in the second scene, and which is reflected in the risk estimation according to which the vehicle is controlled.

Figure 11:
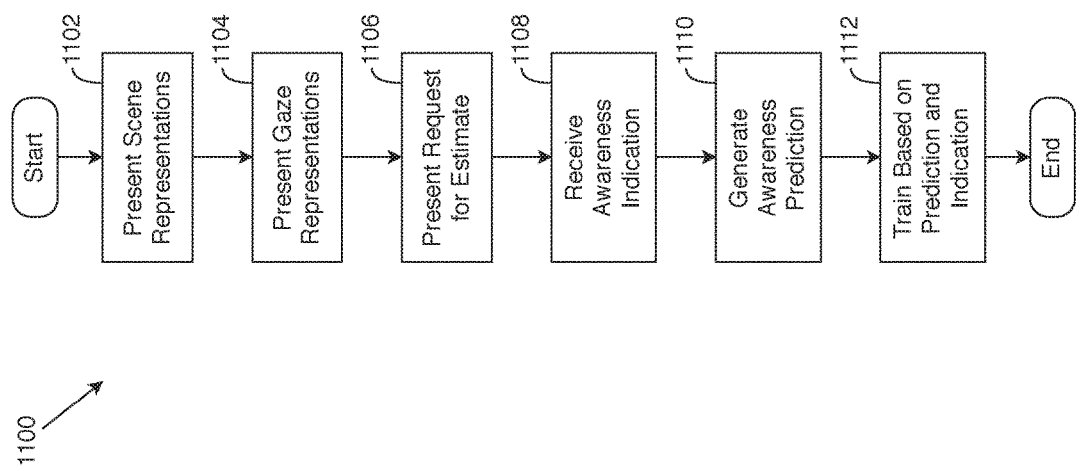
FIG. 11 depicts a flowchart of a method, according to one or more embodiments illustrated and described herein.

FIG. 11 depicts a flowchart of a method 1100, according to one or more embodiments illustrated and described herein. At a step 1102, training server 102 (or another entity or computing device) presents, via a user interface, a video comprising a plurality of frames. Each frame comprises a respective scene representation of a scene at a respective time, and the scene representation in each frame comprises a respective representation of a feature in the scene. At step 1104, training server presents, for each frame via the user interface, a respective gaze representation of a driver gaze of a driver. The gaze representation for each frame comprises a respective representation of a location of the driver gaze within the scene at the time of the respective scene representation in the frame. Step 1102 and step 1104 may take a form similar to step 502 and step 504, respectively, described above with respect to FIG. 5.

At step 1106, training server 102 presents, via the user interface, a request to estimate a driver awareness of the feature in the scene based on the video and the respective gaze representation for each frame (as presented at step 1102 and step 1104), and at step 1108, the training server receives, via the user interface, an awareness indication associated with the request presented via the user interface at step 1106. Presenting the request and receiving the awareness indication could take forms similar to those described above—for example, with reference to step 508 of FIG. 5 described above.

At step 1110, training server 102 generates an awareness prediction via a neural network based on the location of the driver gaze within the scene at the time of the respective scene representation in each frame. The awareness prediction reflects a predicted driver awareness of the feature in the scene. At step 1112, training server 102 trains the neural network based on a comparison of the awareness indication received via the user interface and the awareness prediction generated via the neural network. Step 1110 and step 1112 may take a form similar to step 508 and step 510, respectively, described above with respect to FIG. 5.

It should now be understood that embodiments described herein are directed to systems, computing devices, and methods for predicting driver awareness of a feature in a scene. In some embodiments, a training server presents, via a user interface, a video comprising a plurality of frames. Each frame comprises a respective scene representation of a scene at a respective time, and the scene representation in each frame comprises a respective representation of a feature in the scene. The training server additionally presents, for each frame via the user interface, a respective gaze representation of a driver gaze of a driver. The gaze representation for each frame comprises a respective representation of a location of the driver gaze within the scene at the time of the respective scene representation in the frame. The training server generates an awareness prediction via a neural network based on the location of the driver gaze within the scene at the time of the respective scene representation in each frame. The awareness prediction reflects a predicted driver awareness of the feature in the scene. The training server receives, via the user interface, an awareness indication associated with the video and the respective gaze representation for each frame presented via the user interface, and the training server trains the neural network based on a comparison of the awareness prediction generated via the neural network with the awareness indication received via the user interface. By training the neural network based on the comparison of the awareness prediction with the awareness indication, the neural network could subsequently generate more-accurate awareness predictions that, when generated by a vehicle to which the neural network is deployed after training, may be used by the vehicle to estimate a risk posed to the vehicle and to control the vehicle in accordance with the estimated risk.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method comprising:
presenting, via a user interface, a video comprising a plurality of frames, each frame comprising a respective scene representation of a scene at a respective time, the scene representation in each frame comprising a respective representation of a feature in the scene;
presenting, for each frame via the user interface, a respective gaze representation of a driver gaze of a driver, the gaze representation for each frame comprising a respective representation of a location of the driver gaze within the scene at the time of the respective scene representation in the frame;
generating an awareness prediction via a model trained by supervised machine learning based on the location of the driver gaze within the scene at the time of the respective scene representation in each frame, the awareness prediction reflecting a predicted driver awareness of the feature in the scene;
receiving, via the user interface, an awareness indication associated with the video and the respective gaze representation for each frame presented via the user interface; and
retraining the model based on a comparison of the awareness prediction generated via the model with the awareness indication received via the user interface.

2. The method of claim 1, wherein the scene representation in each frame comprises a respective representation of the scene from a perspective of an image sensor mounted to a vehicle driven by the driver.

3. The method of claim 1, wherein:
the video comprises a representation of the scene over a first time period, and
the awareness prediction is generated based on a driver gaze pattern of the driver over a second time period that comprises the first time period, the driver gaze pattern comprising the driver gaze at the time of the respective scene representation in each frame.

4. The method of claim 1, wherein:
the video comprises a representation of the scene over a given time period, and
the awareness indication comprises an indicated estimation of whether the driver was aware of the feature in the scene during at least part of the given time period.

5. The method of claim 4, wherein the awareness indication comprises an indicated estimation of when the driver became aware of the feature in the scene during the given time period.

6. The method of claim 4, wherein the awareness indication comprises an indicated estimation of whether the driver perceived the feature in the scene during at least part of the given time period.

7. The method of claim 1, further comprising:
executing the retrained model at a vehicle subsequent to training the model;
detecting a driver gaze pattern of a second driver, the driver gaze pattern reflecting locations of a gaze of the second driver within a second scene at respective times during a given time period, the driver gaze pattern being detected by a sensor of the vehicle;
generating a second awareness prediction via the retrained model executed at the vehicle, the second awareness prediction being generated based on the driver gaze pattern of the second driver, the second awareness prediction reflecting a predicted driver awareness of a feature in the second scene;
generating a risk estimation of a risk posed to the vehicle by the feature in the second scene, the risk estimation being generated at the vehicle based on second awareness prediction; and
controlling the vehicle in accordance with the risk estimation.

8. A system comprising a computing device, the computing device including:
a processor, and
a non-transitory computer-readable storage medium comprising computing device instructions that, when executed by the processor, cause the computing device to:
present, via a user interface, a video comprising a plurality of frames, each frame comprising a respective scene representation of a scene at a respective time, the scene representation in each frame comprising a respective representation of a feature in the scene;
present, for each frame via the user interface, a respective gaze representation of a driver gaze of a driver, the gaze representation for each frame comprising a respective representation of a location of the driver gaze within the scene at the time of the respective scene representation in the frame;
generate an awareness prediction via a model trained by supervised machine learning based on the location of the driver gaze within the scene at the time of the respective scene representation in each frame, the awareness prediction reflecting a predicted driver awareness of the feature in the scene;
receive, via the user interface, an awareness indication associated with the video and the respective gaze representation for each frame presented via the user interface; and
retrain the model based on a comparison of the awareness prediction generated via the model with the awareness indication received via the user interface.

9. The system of claim 8, wherein the scene representation in each frame comprises a respective representation of the scene from a perspective of an image sensor mounted to a vehicle driven by the driver.

10. The system of claim 8, wherein:
the video comprises a representation of the scene over a first time period, and
the awareness prediction is generated based on a driver gaze pattern of the driver over a second time period that comprises the first time period, the driver gaze pattern comprising the driver gaze at the time of the respective scene representation in each frame.

11. The system of claim 8, wherein:
the video comprises a representation of the scene over a given time period, and
the awareness indication comprises an indicated estimation of whether the driver was aware of the feature in the scene during at least part of the given time period.

12. The system of claim 11, wherein the awareness indication comprises an indicated estimation of when the driver became aware of the feature in the scene during the given time period.

13. The system of claim 11, wherein the awareness indication comprises an indicated estimation of whether the driver perceived the feature in the scene during at least part of the given time period.

14. The system of claim 8, further comprising a vehicle, the vehicle including:
a gaze sensor,
a processor, and
a non-transitory computer-readable storage medium comprising vehicle instructions that, when executed by the processor, cause the vehicle to:
execute the retrained model at the vehicle subsequent to training of the model by the computing device;
detect a driver gaze pattern of a second driver, the driver gaze pattern reflecting locations of a gaze of the second driver within a second scene at respective times during a given time period, the driver gaze pattern being detected by the gaze sensor;
generate a second awareness prediction via the retrained model executed at the vehicle, the second awareness prediction being generated based on the driver gaze pattern of the second driver, the second awareness prediction reflecting a predicted driver awareness of a feature in the second scene;
generate a risk estimation of a risk posed to the vehicle by the feature in the second scene, the risk estimation being generated at the vehicle based on second awareness prediction; and
control the vehicle in accordance with the risk estimation.

15. A method comprising:
presenting, via a user interface, a video comprising a plurality of frames, each frame comprising a respective scene representation of a scene at a respective time, the scene representation in each frame comprising a respective representation of a feature in the scene;
presenting, for each frame via the user interface, a respective gaze representation of a driver gaze of a driver, the gaze representation for each frame comprising a respective representation of a location of the driver gaze within the scene at the time of the respective scene representation in the frame;
presenting, via the user interface, a request to estimate a driver awareness of the feature in the scene based on the video and the respective gaze representation for each frame,
receiving, via the user interface, an awareness indication associated with the request presented via the user interface;
generating an awareness prediction via a model trained by supervised machine learning based on the location of the driver gaze within the scene at the time of the respective scene representation in each frame, the awareness prediction reflecting a predicted driver awareness of the feature in the scene; and
retraining the model based on a comparison of the awareness indication received via the user interface and the awareness prediction generated via the model.

16. The method of claim 15, wherein the scene representation in each frame comprises a respective representation of the scene from a perspective of an image sensor mounted to a vehicle driven by the driver.

17. The method of claim 15, wherein:
the video comprises a representation of the scene over a first time period, and
the awareness prediction is generated based on a driver gaze pattern of the driver over a second time period that comprises the first time period, the driver gaze pattern comprising the driver gaze at the time of the respective scene representation in each frame.

18. The method of claim 15, wherein:
the video comprises a representation of the scene over a given time period, and
the awareness indication comprises an indicated estimation of whether the driver was aware of the feature in the scene during at least part of the given time period.

19. The method of claim 18, wherein the awareness indication comprises an indicated estimation of when the driver became aware of the feature in the scene during the given time period.

20. The method of claim 15, further comprising:
executing the retrained model at a vehicle subsequent to training the model;
detecting a driver gaze pattern of a second driver, the driver gaze pattern reflecting locations of a gaze of the second driver within a second scene at respective times during a given time period, the driver gaze pattern being detected by a sensor of the vehicle;
generating a second awareness prediction via the retrained model executed at the vehicle, the second awareness prediction being generated based on the driver gaze pattern of the second driver, the second awareness prediction reflecting a predicted driver awareness of a feature in the second scene;
generating a risk estimation of a risk posed to the vehicle by the feature in the second scene, the risk estimation being generated at the vehicle based on second awareness prediction; and
controlling the vehicle in accordance with the risk estimation.

* * * * *